US012701509B2

(12) United States Patent
Liao et al.

(10) Patent No.: US 12,701,509 B2
(45) Date of Patent: Aug. 4, 2026

(54) DUAL-RADIO COMMUNICATION DEVICE, AND OPERATING METHOD THEREOF

(71) Applicant: MEDIATEK INC., Hsinchu City (TW)

(72) Inventors: Yi-Ju Liao, Hsinchu City (TW); Wei-De Wu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 358 days.

(21) Appl. No.: 18/502,034

(22) Filed: Nov. 5, 2023

(65) Prior Publication Data

US 2024/0163796 A1     May 16, 2024

Related U.S. Application Data

(60) Provisional application No. 63/383,275, filed on Nov. 11, 2022.

(51) Int. Cl.
*H04W 52/02* (2009.01)
(52) U.S. Cl.
CPC ............................... *H04W 52/0229* (2013.01)
(58) Field of Classification Search
CPC ........... H04W 52/0229; H04W 52/028; H04W 52/0235; H04W 52/0245
See application file for complete search history.

(56) References Cited

U.S. PATENT DOCUMENTS

| 2020/0260304 A1* | 8/2020 | Zhou | H04W 52/0235 |
| 2022/0086756 A1* | 3/2022 | Reial | H04W 52/0229 |
| 2024/0114449 A1* | 4/2024 | Elshafie | H04W 52/0225 |

OTHER PUBLICATIONS

Extended European Search Report dated Apr. 10, 2024, issued in application No. EP 23208494.7.
Chinese language office action dated Apr. 22, 2024, issued in application No. TW 112143490.
TCL; "Low Power WUS receiver architecture;" 3GPP TSG RAN WG1 Meeting # 110bis-e; Sep. 2022; pp. 1-3.
VIVO; "Evaluation methodologies for R18 LP-WUS/WUR;" 3GPP TSG RAN WG1 #110bis-e; Sep. 2022; pp. 1-26.

* cited by examiner

*Primary Examiner* — Farid Seyedvosoghi
(74) *Attorney, Agent, or Firm* — McClure, Qualey & Rodack, LLP

(57) ABSTRACT

An operating method executed by a wireless communication device is provided. The method includes selecting a high-performance receiver to receive a wireless signal from a transmitting device in response to the wireless signal being a first type of signal on a high-performance radio layer; and selecting a low-power receiver or the high-performance receiver to receive the wireless signal from the transmitting device in response to the wireless signal being a second type of signal on a low-power radio layer.

18 Claims, 5 Drawing Sheets

DUAL-RADIO COMMUNICATION DEVICE, AND OPERATING METHOD THEREOF

CROSS REFERENCE TO RELATED APPLICATIONS

This application claims the benefit of U.S. Provisional Application No. 63/383,275, entitled "Design on Dual Radio for B5G/6G", filed on Nov. 11, 2022, the entirety of which is incorporated by reference herein.

BACKGROUND OF THE INVENTION

Field of the Invention

The present disclosure generally relates to wireless communications. More specifically, aspects of the present disclosure relate to a dual-radio communication device, and an operating method thereof in a beyond 5G (B5G) or 6G communication system.

Description of the Related Art

In New Radio (NR) systems, a high-performance transmitter/high-performance receiver is used for communication between user equipments (UEs), or between a UE and a base station (BS).

As shown in FIG. 1, a transmitting device may transmit a signal/channel to a receiving device via a high-performance transmitter 110 over a single radio link, and the receiving device may receive the signal/channel from the high-performance transmitter 110 via a high-performance receiver 120 over the single radio link.

However, the use of a single radio can result in increased power consumption in B5G (beyond 5G) or 6G communication systems. For example, in such systems, the BS may periodically broadcast signals to the UE with high power consumption even though the traffic between the BS and the UE is sparse.

Therefore, there is a need for a dual-radio communication device and an operating method thereof to provide improved power consumption in B5G or 6G communication systems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a dual-radio communication device and an operating method thereof to provide improved power consumption in B5G or 6G communication systems In an exemplary embodiment, an operating method executed by a wireless communication device is provided. The method includes selecting a high-performance receiver to receive a wireless signal from a transmitting device in response to the wireless signal being a first type of signal on a high-performance radio layer; and selecting a low-power receiver or the high-performance receiver to receive the wireless signal from the transmitting device in response to the wireless signal being a second type of signal on a low-power radio layer.

In some embodiments, the first type of signal is a broadcast signal, a control channel signal, a data channel signal, a reference signal for fine time and frequency (T/F) synchronization, a reference signal for Channel-state information (CSI) acquisition, or a reference signal for beam management.

In some embodiments, the second type of signal is a signal for cell ID acquisition, a signal for cell measurement, a reference signal for coarse timing synchronization, a wake-up signal, or a short control message.

In some embodiments, when the low power receiver is selected, the method further comprises: switching from the low-power receiver to the high performance receiver when one of the following situations occurs: the wireless communication device receives a wake-up signal from the transmitting device; the wireless communication device is under low signal-to-noise ratio (SNR) conditions; the wireless communication device is in cell edge; and the wireless communication device is in high mobility state.

In some embodiments, when the wireless signal is a wake-up signal transmitted from the transmitting device, the method further comprises: indicating to wake up the high-performance receiver to monitor Physical Downlink Control Channel (PDCCH) corresponding to the wake-up signal; wherein the wake-up signal is associated to the PDCCH.

In some embodiments, the wireless communication device is a user equipment (UE).

In some embodiments, the transmitting device is a base station.

In some embodiments, the big xSSB is a beamformed signal with a bandwidth greater than 3 MHz and a periodicity greater than 20 milliseconds (ms).

In some embodiments, the little SS is an omnidirectional signal with a bandwidth less than or equal to 3 MHz and a periodicity less than or equal to 20 milliseconds (ms).

In an exemplary embodiment, an operating method executed by a wireless communication device is provided. The method includes selecting a high-performance radio layer to transmit a wireless signal to a receiving device in response to the wireless signal being a first type of signal; and selecting the low-power radio layer to transmit the wireless signal to the receiving device in response to the wireless signal being a second type of signal.

In some embodiments, the first type of signal is a control channel signal, a data channel signal, a reference signal for Channel-state information (CSI) acquisition, or a physical random access channel (PRACH) signal.

In some embodiments, the second type of signal is a wake-up signal, a reference signal for time and frequency (T/F) synchronization, or a short control message.

In some embodiments, the wireless communication device is a user equipment (UE).

In some embodiments, the wireless communication device and the transmitting device are in a beyond 5G (B5G) or 6G communication system.

In an exemplary embodiment, a wireless communication device is provided. The wireless communication device comprises a high-performance receiver, a low-power receiver and a controller. The controller coupled to the high-performance receiver, the low-power receiver and operable to: configure the wireless communication device to select the high-performance receiver to receive a wireless signal from a transmitting device in response to the wireless signal being a first type of signal on a high-performance radio layer and select the low-power receiver or the high-performance receiver to receive the wireless signal from the transmitting device in response to the wireless signal being a second type of signal on a low-power radio layer.

In an exemplary embodiment, a wireless communication device is provided. The wireless communication device comprises a transmitter and a controller. The controller coupled to the transmitter and operable to: configure the wireless communication device to select a high-performance radio layer to transmit a wireless signal to a receiving device in response to the wireless signal being a first type of signal and select a low-power radio layer to transmit the wireless signal to the receiving device in response to the wireless signal being a second type of signal.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
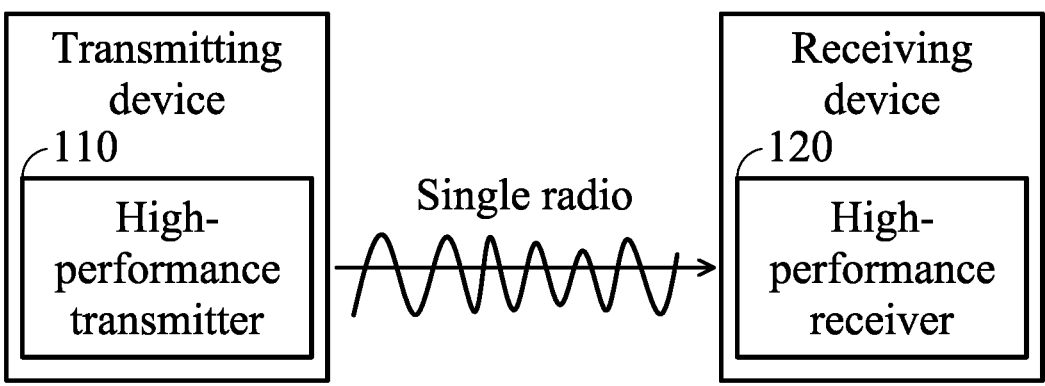
FIG. 1 is a schematic flowchart illustrating the communication between high-performance transmitter of a transmitting device and a high-performance receiver of a receiving device over a single radio link in the prior art.
Figure 2:
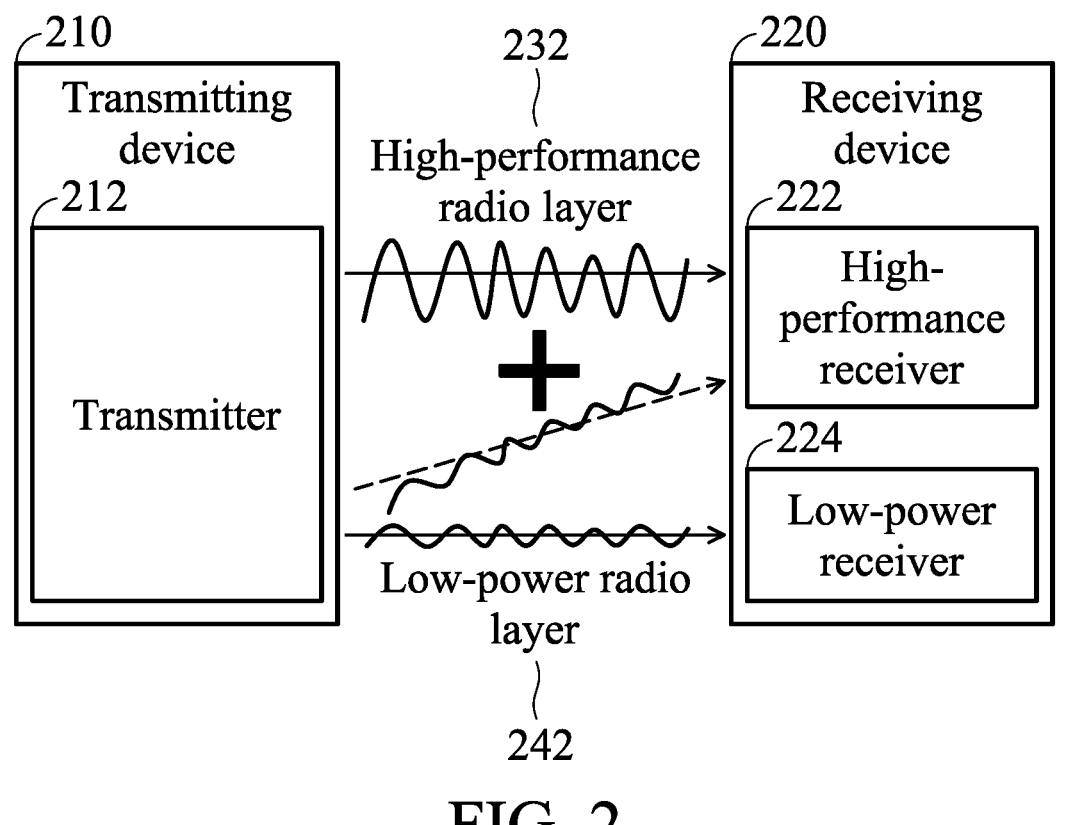
FIG. 2 is a block diagram illustrating a transmitting device in communication with a receiving device in a beyond 5G (B5G) or 6G communication system according to an embodiment of the disclosure.

FIG. 2 is a block diagram illustrating a transmitting device 210 in communication with a receiving device 220 in a beyond 5G (B5G) or 6G communication system 200 according to an embodiment of the disclosure.

The transmitting device 210 and the receiving device 220 can be a user equipment (UE) or a base station.

The transmitting device 210 may at least include a transmitter 212, wherein the transmitter 212 may facilitate communication with the receiving device 220 on a high-performance radio layer 232 or a low-power radio layer 234.

The term "radio layer" refers generally to a portion of the physical abstraction layer, and in some cases, a portion of the data link layer of the open systems interconnection (OSI) model that is associated with radio communication by the transmitting device 210. The transmitter 212 may include one or more radio antennas, a wireless transceiver and associated software that executes on the transmitting device 210, providing a wireless communication link with the receiving device 220. The transmitter 212 can perform signal processing functions that convert data into signals to be transmitted.

The transmitting device 210 may select one of the high-performance radio layer 232 and the low-power radio layer 234 to transmit signals to the receiving device 220.

In some embodiments, the transmitting device 210 selects the high-performance radio layer 232 to transmit a wireless signal in response to the wireless signal being a first type of signal, wherein the first type of signal may be a control channel signal (e.g., PUCCH for HARQ-ACK information feedback, CSI reporting, SR, etc.), a data channel signal (e.g., PUSCH), a reference signal for Channel-state information (CSI) acquisition (e.g., SRS), or a physical random access channel (PRACH) signal. The transmitting device 210 selects the low-power radio layer 234 to transmit the wireless signal in response to the wireless signal being the second type of signal, wherein the second type of signal may be a wake-up signal, a reference signal (RS) for time and frequency (T/F) synchronization (e.g., RS for collaborative devices to perform synchronization), or a short control message (e.g., control message exchange between a UE and collaborative devices).

The receiving device 220 may include a high-performance receiver 222 and a low-power receiver 224, wherein the high-performance receiver 222 and the low-power receiver 224 facilitate communication with the transmitting device 210.

The high-performance receiver 222 and the low-power receiver 224 include one or more radio antennas, a wireless receiver and associated software that executes on the receiving device 220, receiving signals from with the transmitting device 210.

The receiving device 220 may select one of the high-performance receiver 222 and the low-power receiver 224 to receive signals from the transmitting device 210. In some embodiments, the receiving device 220 selects the high-performance receiver 222 to receive a wireless signal in response to the wireless signal being the first type of signal, wherein the first type of signal is a broadcast signal (e.g., MIB, SIBx), a control channel signal (e.g., PDCCH), a data channel signal (e.g., PDSCH), a reference signal for fine time and frequency (T/F) synchronization (e.g., TRS), a reference signal for Channel-state information (CSI) acquisition (e.g., CSI-RS), or a reference signal for beam management (e.g., CSI-RS). The receiving device 220 selects the low-power receiver 224 or the high-performance receiver 222 to receive the wireless signal in response to the wireless signal being the second type of signal, wherein the second type of signal may be a signal for cell ID acquisition, a signal for cell measurement, a reference signal for coarse timing synchronization, a wake-up signal, or a short control message.

Specifically, the wireless signal transmitted by the transmitting device 210 via the high-performance radio layer 232 can only be received by the high-performance receiver 222 of the receiving device 220. The wireless signal transmitted by the transmitting device 210 via the low-power radio layer 234 can be received by the high-performance receiver 222 or the low-power receiver 224 of the receiving device 220.

In another embodiment, the high-performance radio layer 232 and the low-power radio layer 234 can have different waveforms, wherein the signals transmitted via the low-power radio layer 234 can be on-off keying (OOK) signals, frequency shift keying (FSK) signals or phase-shift keying (PSK) signals, the signals transmitted via the high-performance radio layer 232 can be discrete Fourier transform spread orthogonal frequency division multiplexing (DFT-s-OFDM) signals or cyclic prefix-orthogonal frequency divisional multiplexing (CP-OFDM) signals.

In another embodiment, the timing synchronization estimated based on a wireless signal transmitted on the low-power radio layer 234 can be as reference for a wireless signal transmitted on the high-performance radio layer 232.

In another embodiment, the frequency or/and timing offset estimated by the low-power receiver 224 of the receiving device 220 can be as reference for the high-performance receiver 222 of the receiving device 220.

In some embodiments, when the low-power receiver 224 has first selected by the receiving device 220, the receiving device 220 may switch from the low-power receiver 224 to the high-performance receiver 222 when one of the following situations occurs: (1) the receiving device 220 receives a wake-up signal from the transmitting device 210; (2) the receiving device 220 is under low signal-to-noise ratio (SNR) conditions; (3) the receiving device 220 is in cell edge; or (4) the receiving device 220 is in high mobility state.

It should be understood that, for convenience of explanation, FIG. 2 only describes that the transmitting device

210 includes a transmitter 212, and the receiving device 220 includes a high-performance receiver 222 and a low-power receiver 224, but it should not be limited in the disclosure. For example, the transmitting device 210 may also include a high-performance receiver and a low-power receiver that perform the same receiving functions as the high-performance receiver 222 and the low-power receiver 224. The receiving device 220 may also include a transmitter that perform the same transmitting functions as the transmitter 212.

Figure 3:
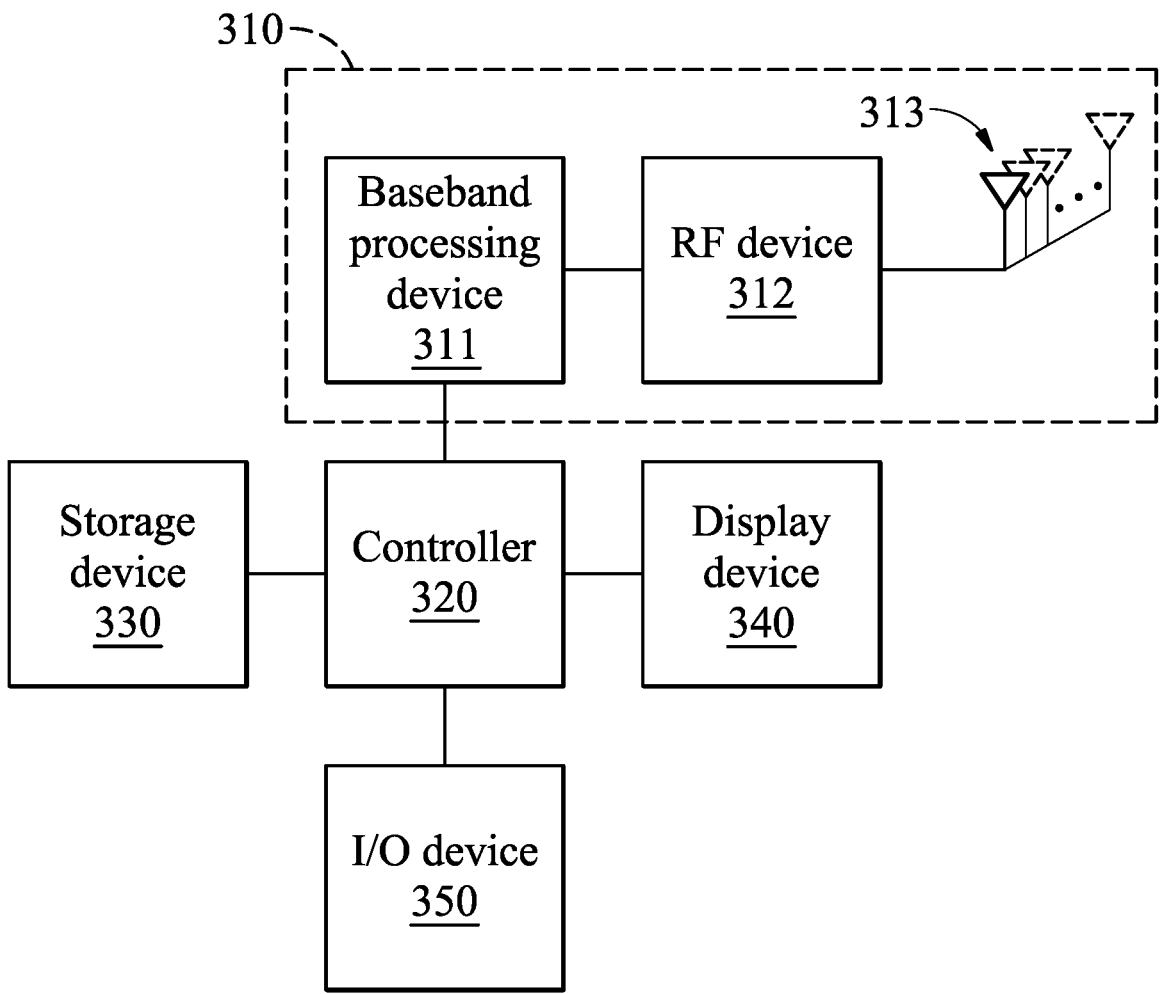
FIG. 3 is a block diagram illustrating a wireless communication device according to an embodiment of the disclosure.

FIG. 3 is a block diagram illustrating a wireless communication device according to an embodiment of the disclosure, wherein the wireless communication device may be the transmitting device 210 or the receiving device 220 in FIG. 2.

As shown in FIG. 3, the wireless communication device (e.g., the transmitting device 210 or the receiving device 220) may include a wireless transceiver 310, a controller 320, a storage device 330, a display device 340, and an Input/Output (I/O) device 350.

The wireless transceiver 310 is configured to perform wireless transmission and reception to and from other wireless communication device in a B5G/6G network. Specifically, the wireless transceiver 310 may include a baseband processing device 311, a Radio Frequency (RF) device 312, and one or more antennas 313, wherein the antenna 313 may include an antenna array for beamforming.

It should be noted that, in some embodiments of the disclosure, the number of the wireless transceiver 310 may be extended to more than one, and the disclosure should not be limited to what is shown in FIG. 3. In other words, the wireless transceiver 310 can serve as the high-performance receiver 222, the low-power receiver 224 and the transmitter 212 in FIG. 2 and perform their corresponding functions.

The baseband processing device 311 is configured to perform baseband signal processing. The baseband processing device 311 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 312 may receive RF wireless signals via the antenna 313, convert the received RF wireless signals to baseband signals, which are processed by the baseband processing device 311, or receive baseband signals from the baseband processing device 311 and convert the received baseband signals to RF wireless signals, which are later transmitted via the antenna 313. The RF device 312 may also contain multiple hardware devices to perform radio frequency conversion. For example, the RF device 312 may comprise a mixer to multiply the baseband signals with a carrier oscillated in the radio frequency of the supported RAT(s), wherein the radio frequency may be 900 MHz, 2100 MHz, or 2.6 GHz utilized in 4G LTE/LTE-A/TD-LTE technology, or may be any radio frequency utilized in the 5G NR, beyond 5G (B5G), or sixth generation (6G) technology, or another radio frequency, depending on the RAT in use.

The controller 320 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 310 for wireless communication, storing and retrieving data to and from the storage device 330, sending a series of frame data (e.g. representing text messages, graphics, images, etc.) to the display device 340, and receiving user inputs or outputting signals via the I/O device 350.

In particular, the controller 320 coordinates the aforementioned operations of the wireless transceiver 310, the storage device 330, the display device 340, and the I/O device 350 to perform the method of the present disclosure.

In another embodiment, the controller 320 may be incorporated into the baseband processing device 311, to serve as a baseband processor.

As will be appreciated by persons skilled in the art, the circuits of the controller 320 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 330 may be a non-transitory machine-readable storage medium, including a non-volatile memory (e.g., a FLASH memory or a Non-Volatile Random Access Memory (NVRAM)), or a Universal Integrated Circuit Card (UICC) (e.g., a Subscriber Identity Module (SIM) or Universal SIM (USIM)), or a magnetic storage device (e.g., a hard disk or a magnetic tape), or an optical disc, or any combination thereof for storing data, instructions, and/or program code of applications, communication protocols (e.g., the SIP and the 4G/5G/B5G/6G protocol), and/or the method of the present disclosure. In one example, the method of the present disclosure may be implemented as part of the SIP and/or the 4G/5G/B5G/6G protocol. A 4G/5G/B5G/6G protocol stack may include a Non-Access-Stratum (NAS) layer to communicate with an AMF/SMF/MME entity in the 3GPP core network, and an Access Stratum (AS) layer consisting of multiple sublayers, such as a Radio Resource Control (RRC) sublayer for high layer configuration and control of, a Packet Data Convergence Protocol/Radio Link Control (PDCP/RLC) sublayer, a Media Access Control (MAC) sublayer, and a Physical (PHY) sublayer.

The display device 340 may be a Liquid-Crystal Display (LCD), a Light-Emitting Diode (LED) display, an Organic LED (OLED) display, or an Electronic Paper Display (EPD), etc., for providing a display function. Alternatively, the display device 340 may further include one or more touch sensors disposed thereon or thereunder for sensing touches, contacts, or approximations of objects, such as fingers or styluses.

The I/O device 350 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 3 are for illustrative purposes only and are not intended to limit the scope of the disclosure. For example, a wireless communication device may include more components, such as a power supply, or a Global Positioning System (GPS) device, wherein the power supply may be a mobile/replaceable battery providing power to all the other components of the wireless communication device, and the GPS device may provide the location information of the wireless communication device for use by some location-based services or applications. Alternatively, a wireless communication device may include fewer components. For example, the wireless communication device may not include the display device 340 and/or the I/O device 350.

Figure 4:
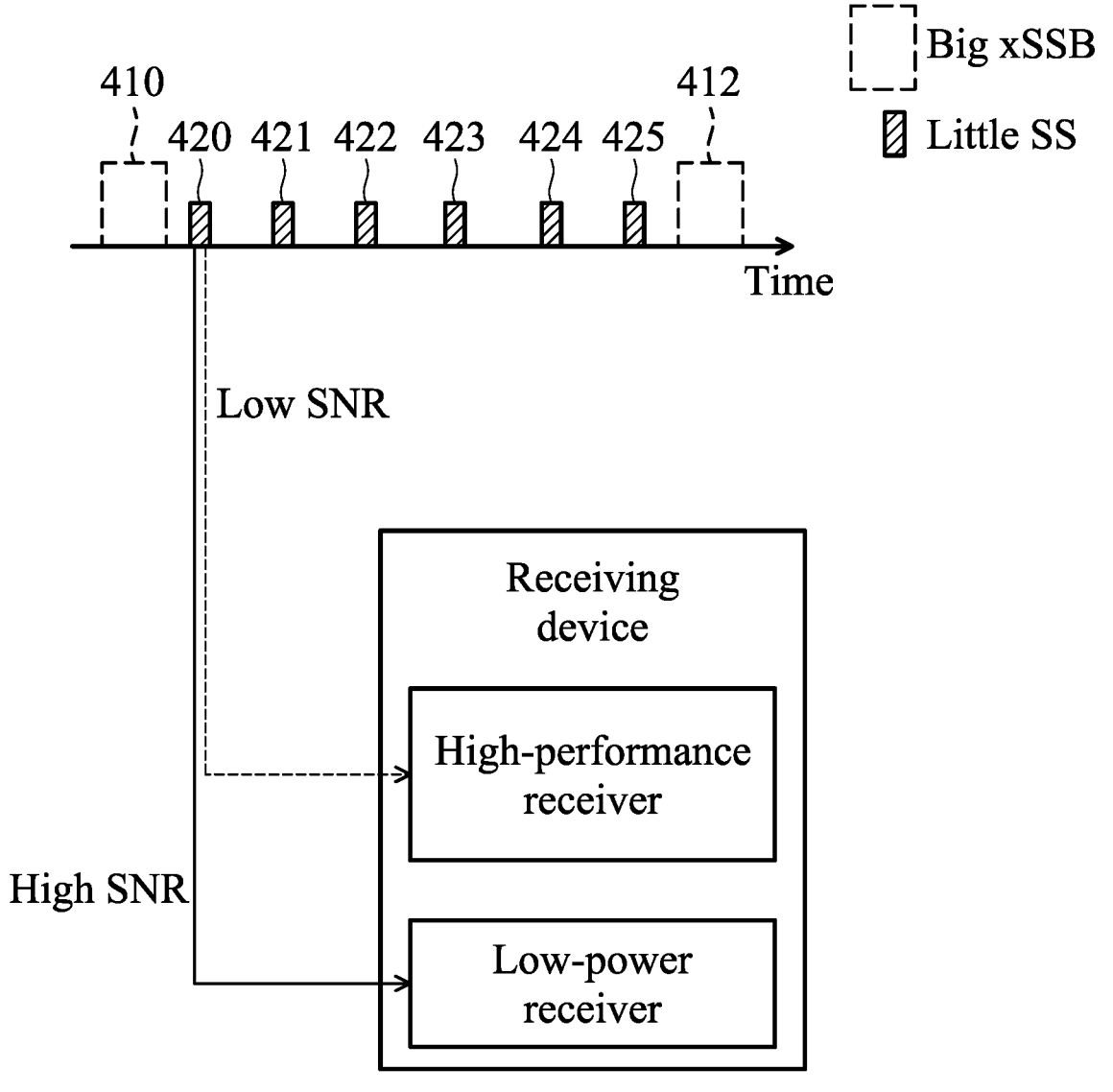
FIG. 4 is a schematic flowchart illustrating the operation between the transmitting device and the receiving device according to an embodiment of the disclosure.

FIG. 4 is a schematic flowchart illustrating the operation between the transmitting device and the receiving device according to an embodiment of the disclosure. In FIG. 4, the transmitting device is a base station and the receiving device is a UE.

The signals on the time axis is the signals sent by the transmission device, wherein the signals 410 and 412 depicted by the dotted line represent the signals transmitted on the high-performance radio layer by the transmitting device, and the signals 420~425 depicted by the solid line represent the signals transmitted on the low-power radio layer by the transmission device.

The signal (e.g., the signals 410 and 412) transmitted on the high-performance radio layer by the transmitting device is a big extended synchronization signal block (xSSB). The big xSSB is a beamformed signal with a bandwidth greater than 3 MHz and a periodicity greater than 20 milliseconds (ms), and is used for fine timing/frequency synchronization and broadcast information delivery. The signal (e.g., the signals 420~425) transmitted on the low-power radio layer by the transmitting device is a little synchronization signal (SS). The little SS is an omnidirectional signal with a bandwidth less than or equal to 3 MHz and a periodicity less than or equal to 20 milliseconds (ms), and is used for timing synchronization, cell measurement or/and Cell ID detection. Since the little SS is transmitted repeatedly in time domain or has long sequence in time domain, the coverage level will be increased.

In one embodiment, the receiving device selects a low-power receiver by default to receive the little SS. However, the receiving device can switch from the low-power receiver to the high-performance receiver to receive little SS when one of the following situation occurs: (1) the receiving device receives a wake-up signal from the transmitting device; (2) the receiving device is in low signal-to-noise ratio (SNR) conditions; (3) the receiving device is in cell edge; or (4) the receiving device is in high mobility state. As shown in FIG. 4, the receiving device can receive the little SS 420 using the high-performance receiver when the receiving device is under low SNR conditions or receive the little SS using the low-power receiver when the receiving device is under high SNR conditions.

Using little SS is beneficial for power consumption of the transmitting device because the power consumption of the transmitting device decreases with lower bandwidth (BW), transceiver unit (TxRU) number, power level and low peak-to-average power ratio (PAPR). In addition, when the little SS is multiplexing with other signal/channel from the same or different cell, the guard band (e.g., FDM) or guard period (e.g., TDM) is inserted between the little SS and other signal/channel to avoid interference and guarantee the performance.

Figure 5:
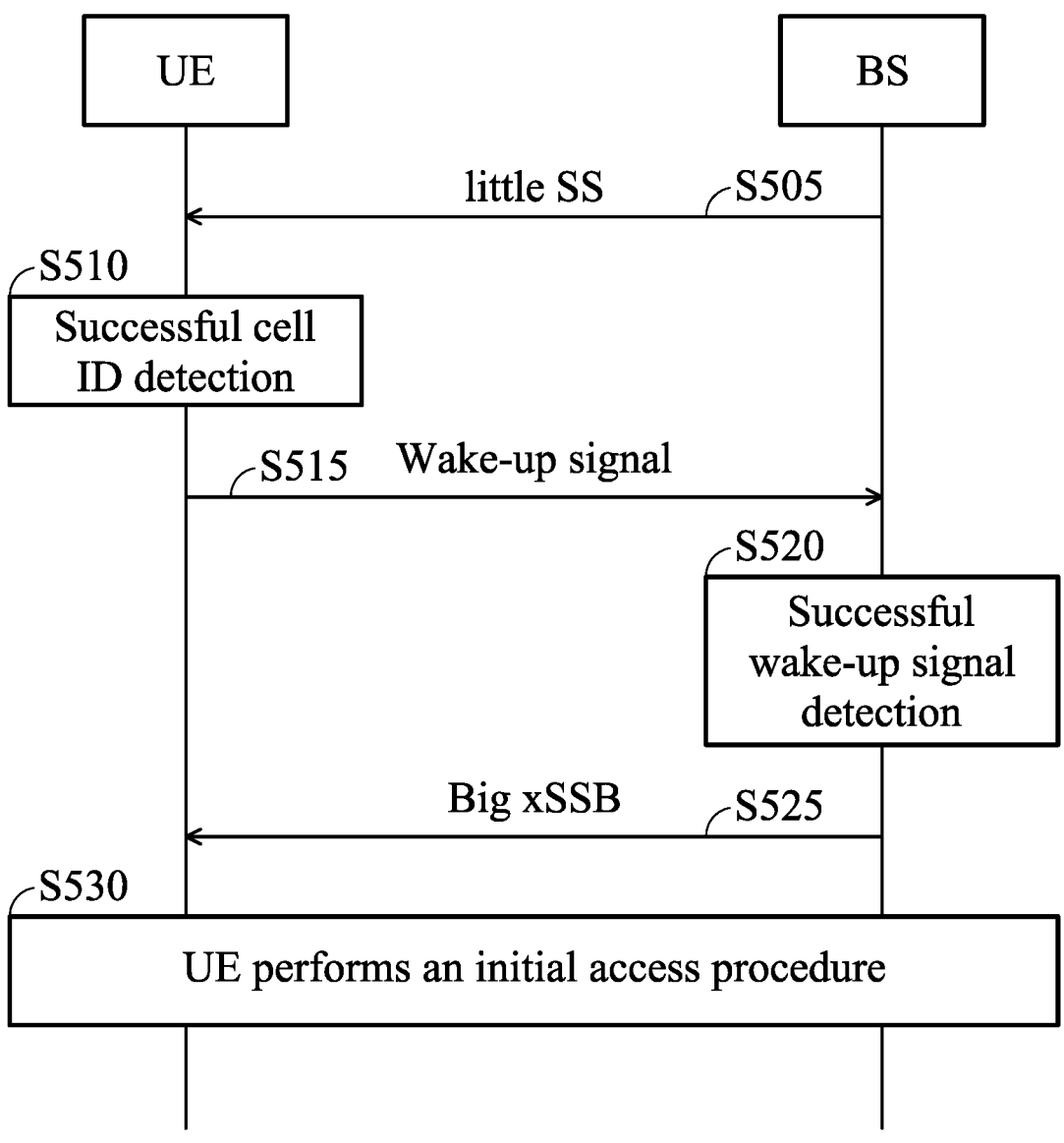
FIG. 5 is a message sequence chart illustrating an example of cell search between a UE and a base station (BS) based on the little SS and the big xSSB according to an embodiment of the disclosure.

FIG. 5 is a message sequence chart illustrating an example of cell search between a UE and a base station (BS) based on the little SS and the big xSSB according to an embodiment of the disclosure.

In step S505, the BS broadcasts little SSs on the low-power radio layer. The UE can use a low-power receiver or a high-performance receiver to detect the little SS for cell discovery/search.

In step S510, the UE successfully detects a cell ID according to the little SS from the BS.

In step S515, the UE transmits a wake-up signal to the BS on the low-power radio layer to request for cell access. It should be noted that in step S505, the UE may receive the little SSs transmitted by many BSs. Therefore, in step S515, the UE may send the wake-up signal only to the strongest cell, send the wake-up signals to cell(s) with the SNR higher than a threshold, or send the wake-up signals to all detectable cell(s).

In another embodiment, occasion of the wake-up signal is a time or/and frequency offset to the little SS, wherein the offset is indicated by the little SS or specified in 3GPP specifications.

In step S520, the BS successfully detects the wake-up signal after receiving the wake-up signal from the UE.

In step S525, the BS transmits the big xSSB to the UE on high-performance radio layer. The UE uses the high-performance receiver to receive the big xSSB from the BS.

In step S530, the UE performs an initial access procedure to access the cell, e.g., acquire MIB/SIB and random access.

Figure 6A:
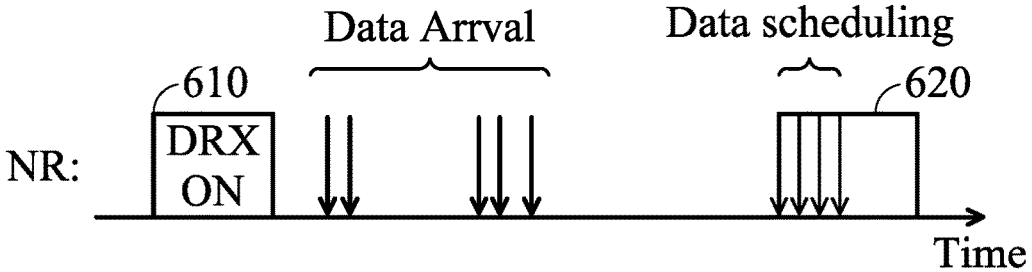
FIG. 6A is a schematic diagram illustrating a common DRX configuration in the prior art.

FIG. 6A is a schematic diagram illustrating a common DRX configuration in the prior art.

In the NR system of FIG. 6A, the receiving device monitors for incoming data transmission during the DRX ON duration 610. If no data transmissions are forthcoming, the receiving device may go to sleep until a subsequent DRX ON duration 612. The receiving device may wake up for the subsequent DRX ON duration 612 and monitor for incoming data transmissions. In other words, the transmitting device must perform data scheduling in the subsequent DRX ON duration 612.

Figure 6B:
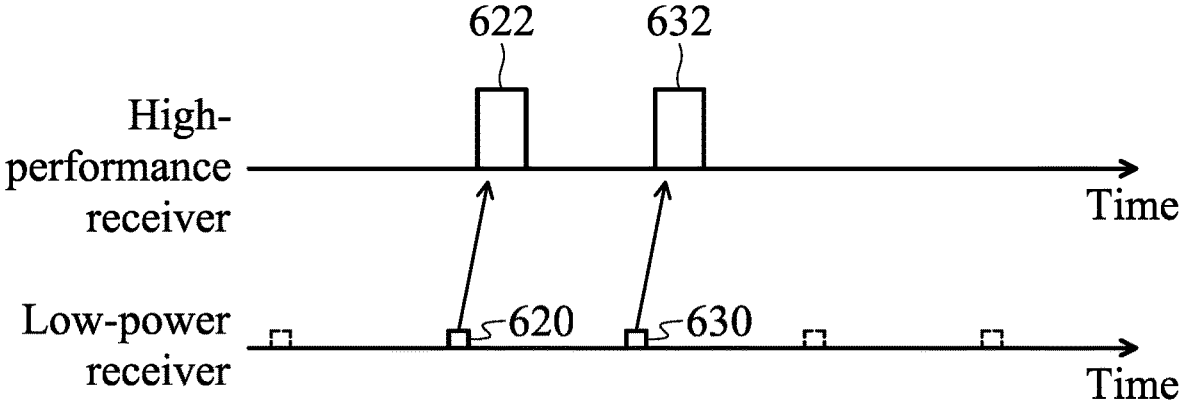
FIG. 6B is a schematic diagram illustrating how a wake-up signal is applied in a discontinuous reception (DRX)-free mode according to an embodiment of the disclosure.

FIG. 6B is a schematic diagram illustrating how a wake-up signal is applied in a discontinuous reception (DRX)-free mode according to an embodiment of the disclosure.

Since the receiving device uses the high-performance receiver and the low-power receiver, the receiving device can monitor the wake-up signal through the low-power receiver and make the high-performance receiver stay in a micro-sleep state by default. When the receiving device detects the wake-up signal, the receiving device indicates to wake up the high-performance receiver to monitor the PDCCH corresponding to the wake-up signal. As shown in FIG. 6B, when the receiving device detects the wake-up signals 620 and 630 that indicate the receiving device to wake up, the receiving device indicates to wake up the high-performance receiver to monitor the PDCCH 622 corresponding to the wake-up signal 620 and the PDCCH 632 corresponding to the wake-up signal 630. Otherwise, the receiving device does not wake up the high-performance receiver for PDCCH monitoring.

In FIG. 6B, the receiving device uses the low-power receiver to monitor the wake-up signals in the DRX-free mode, which is beneficial to reducing unnecessary PDCCH monitoring, while keeping low data latency via frequent wake-up signal monitoring.

In another embodiment, the wake-up signal is associated to PDCCH. For example, a UE monitors a wake-up signal to determine whether to monitor PDCCH corresponding to the wake-up signal before every PDCCH monitoring occasion.

In another embodiment, the wake-up signal is associated to a search space. UE-specific RRC signaling may configure the association between the wake-up signal and the search space. For the search space associated with the wake-up signal, the UE monitors the wake-up signal before PDCCH monitoring of the search space. For the search space that is not associated with the wake-up signal, the UE monitors PDCCH monitoring without monitoring the wake-up signal first. In one embodiment, the wake-up signal is associated with every PDCCH monitoring occasion of the search space. In some embodiments, the wake-up signal is associated with the periodicity of the search space. For example, the UE monitors the wake-up signal with the same periodicity of the search space, wherein the wake-up signal is valid for all PDCCH monitoring occasion in the same period.

In another embodiment, the wake-up signal is associated to a control resource set (CORESET). UE-specific RRC signaling may configure the association between the wake-up signal and the CORESET. For the CORESET associated with the wake-up signal, the UE monitors the wake-up signal before PDCCH monitoring of the search space of the CORESET. For the CORESET not associated with the wake-up signal, the UE monitors PDCCH monitoring of the search space of the CORESET without monitoring the wake-up signal first. In one embodiment, the wake-up signal is associated with every PDCCH monitoring occasion of the search space of the CORESET. In some embodiments, the wake-up signal is associated with the periodicity of the search space of the CORESET. For example, the UE monitors the wake-up signal with the same periodicity of the search space of the CORESET, wherein the wake-up signal is valid for all PDCCH monitoring occasion in the same period. In addition, for the CORESET associated with the wake-up signal, the UE does not monitor the wake-up signal before PDCCH monitoring occasion of the following search space: common search space or common search space for broadcast message only, e.g., system information, paging message.

In another embodiment, the wake-up signal is a UE-specific signal which is intended for a single UE, or the wake-up signal is a group-UE-specific signal which is intended for a group of UE.

In view of the forgoing embodiments, it will be appreciated that the present disclosure can use the high-performance receiver, the low-power receiver, the high-performance radio layer and low-power radio layer in different environments or according to different types of signals. The techniques described herein may substantially reduce power consumption within wireless communication devices (e.g., the UE and the BS).

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

11

12

What is claimed is:

1. An operating method, executed by a wireless communication device, the method comprising:

selecting a high-performance receiver to receive a wireless signal from a transmitting device in response to the wireless signal being a first type of signal on a high-performance radio layer; and selecting a low-power receiver or the high-performance receiver to receive the wireless signal from the transmitting device in response to the wireless signal being a second type of signal on a low-power radio layer, wherein when the wireless signal is a wake-up signal transmitted from the transmitting device, the method further comprises:

indicating to wake up the high-performance receiver to monitor Physical Downlink Control Channel (PDCCH) corresponding to the wake-up signal;

wherein the wake-up signal is associated to the PDCCH.

2. The operating method as claimed in claim 1, wherein the first type of signal is a broadcast signal, a control channel signal, a data channel signal, a reference signal for fine time and frequency (T/F) synchronization, a reference signal for Channel-state information (CSI) acquisition, or a reference signal for beam management.

3. The operating method as claimed in claim 1, wherein the second type of signal is a signal for cell ID acquisition, a signal for cell measurement, a reference signal for coarse timing synchronization, a wake-up signal, or a short control message.

4. The operating method as claimed in claim 1, wherein when the low power receiver is selected, the method further comprises:

switching from the low-power receiver to the high performance receiver when one of the following situations occurs:

the wireless communication device receives a wake-up signal from the transmitting device;

the wireless communication device is under low signal-to-noise ratio (SNR) conditions;

the wireless communication device is in cell edge; and the wireless communication device is in high mobility state.

5. The operating method as claimed in claim 1, wherein the wireless communication device is a user equipment (UE).

6. The operating method as claimed in claim 1, wherein the transmitting device is a base station.

7. The operating method as claimed in claim 6, wherein the wireless signal that is the first type of signal is a big extended synchronization signal block (xSSB) transmitted on the high-performance radio layer; and the wireless signal that is the second type of signal is a little synchronization signal (SS) transmitted on the low-power radio layer.

8. The operating method as claimed in claim 7, wherein the big xSSB is a beamformed signal with a bandwidth greater than 3 MHz and a periodicity greater than 20 milliseconds (ms).

9. The operating method as claimed in claim 7, wherein the little SS is an omnidirectional signal with a bandwidth less than or equal to 3 MHz and a periodicity less than or equal to 20 milliseconds (ms).

10. A wireless communication device, comprising:

a high-performance receiver;

a low-power receiver; and a controller, coupled to the high-performance receiver and the low-power receiver and operable to: configure the wireless communication device to select the high-performance receiver to receive a wireless signal from a transmitting device in response to the wireless signal being a first type of signal on a high-performance radio layer and select the low-power receiver or the high-performance receiver to receive the wireless signal from the transmitting device in response to the wireless signal being a second type of signal on a low-power radio layer, wherein when the wireless signal is a wake-up signal transmitted from the transmitting device, the controller further configures the wireless communication device to:

indicate to wake up the high-performance receiver to monitor Physical Downlink Control Channel (PDCCH) corresponding to the wake-up signal;

wherein the wake-up signal is associated to the PDCCH.

11. The wireless communication device as claimed in claim 10, wherein the first type of signal is a broadcast signal, a control channel signal, a data channel signal, a reference signal for fine time and frequency (T/F) synchronization, a reference signal for Channel-state information (CSI) acquisition, or a reference signal for beam management.

12. The wireless communication device as claimed in claim 10, wherein the second type of signal is a signal for cell ID acquisition, a signal for cell measurement, a reference signal for coarse timing synchronization, a wake-up signal, or a short control message.

13. The wireless communication device as claimed in claim 10, wherein when the low power receiver is selected, the controller further configures the wireless communication device to:

switch from the low-power receiver to the high-performance receiver when one of the following situations occurs:

the wireless communication device receives a wake-up signal from the transmitting device;

the wireless communication device is under low signal-to-noise ratio (SNR) conditions;

the wireless communication device is in cell edge; and the wireless communication device is in high mobility state.

14. The wireless communication device as claimed in claim 10, wherein the wireless communication device is a user equipment (UE).

15. The wireless communication device as claimed in claim 10, wherein the transmitting device is a base station.

16. The wireless communication device as claimed in claim 15, wherein the wireless signal that is the first type of signal is a big extended synchronization signal block (xSSB) transmitted on the high-performance radio layer; and the wireless signal that is the second type of signal is a little synchronization signal (SS) transmitted on the low-power radio layer.

17. The wireless communication device as claimed in claim 16, wherein the big xSSB is a beamformed signal with a bandwidth greater than 3 MHz and a periodicity greater than 20 milliseconds (ms).

18. The operating method as claimed in claim 16, wherein the little SS is an omnidirectional signal with a bandwidth less than or equal to 3 MHz and a periodicity less than or equal to 20 milliseconds (ms).

* * * * *